Jan. 31, 1956
A. W. RECHTEN ET AL
2,733,388
MAGNETIC AMPLIFIER
Filed Feb. 18, 1952
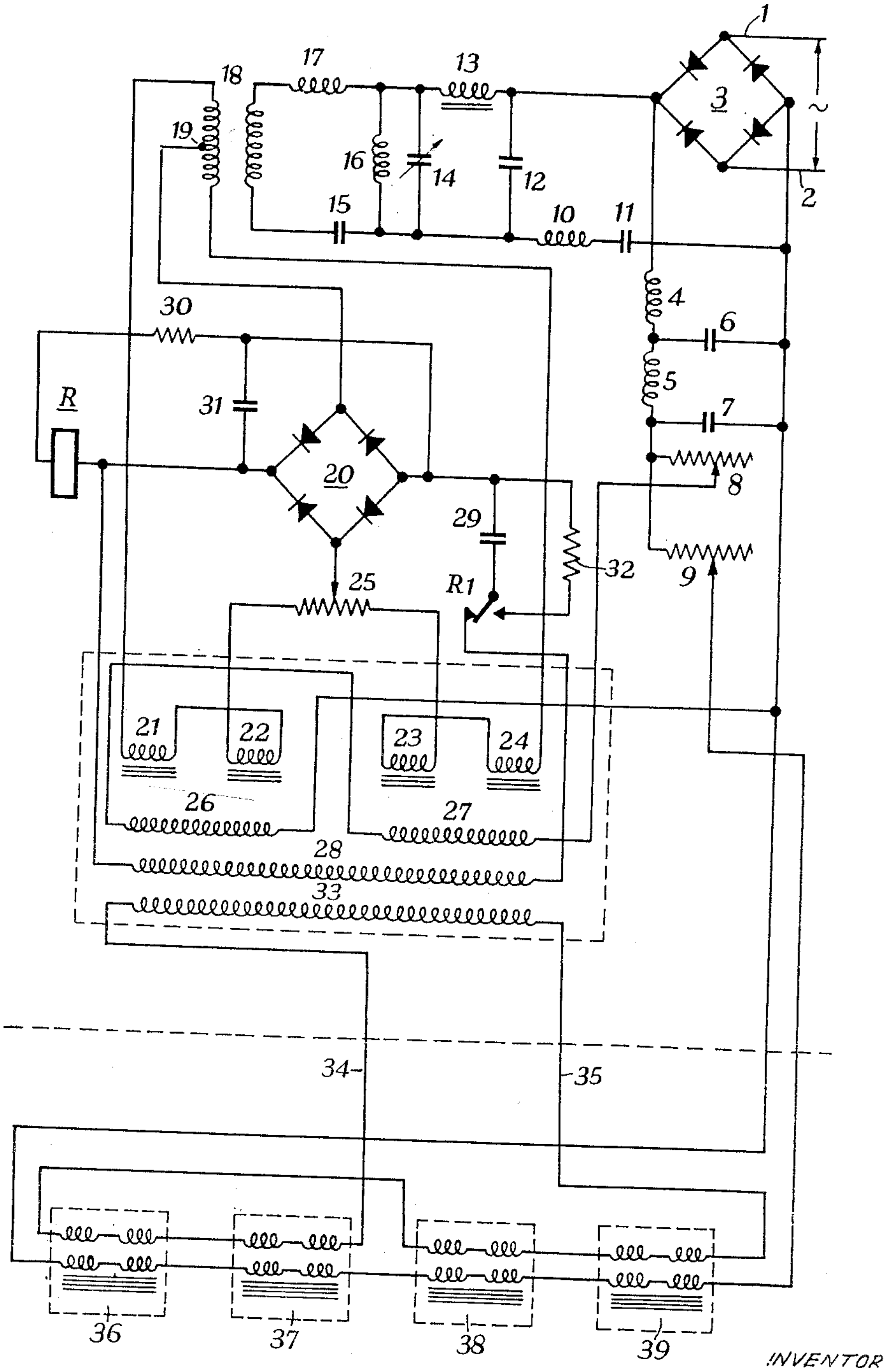
INVENTOR
Adolf Wilhelm Rechten and Brian Maynard Bellman
BY
Dezsoe Steinberg
ATTORNEY

United States Patent Office 2,733,388

Patented Jan. 31, 1956

2,733,388

MAGNETIC AMPLIFIER

Adolf W. Rechten and Brian M. Bellman, Taplow, England, assignors to British Telecommunications Research Limited, Taplow, England, a British company Application February 18, 1952, Serial No. 272,197

Claims priority, application Great Britain February 20, 1951

5 Claims. (Cl. 317—148)

The present invention relates to magnetic amplifiers and is more particularly concerned with arrangements suitable for responding efficiently to short signals of an impulsive nature. Though its use is not limited thereto, it finds particularly advantageous application to arrangements for detecting the movements of objects composed of or including magnetic material.

Apparatus for detecting magnetic objects may be of service in a number of industries where such objects would be likely to cause damage or lower the quality of the final product. The magnetic amplifier according to the invention when used in this manner offers special advantages however in connection with apparatus for the detection of vehicles passing along a road or track, since most vehicles and all motor vehicles at any rate, include sufficient magnetic material to make their detection readily feasible by this method. The signals obtained from the output of the amplifier may energise an electromagnetic relay for controlling the operation of traffic signals or for effecting some switching operation such as the opening of garage doors.

According to the invention a magnetic amplifier for effecting the operation of an electromagnetic relay in response to an impulsive signal in its control circuit is provided with a winding to give positive feedback in such manner that on receipt of a signal a condition of temporary instability is produced so that the same response is obtained for all signals above a definite threshold value.

It is already known that improved performance of magnetic amplifiers can be obtained by operating at a higher frequency than that of the commercial supply mains. According to a subsidiary feature of the invention the desired higher frequency is obtained from the mains by filtering out the second harmonic from the rectifier which is employed for providing the direct current supply and feeding this to a saturable choke which produces a number of odd harmonics from which the fifth may be filtered out. Thus with a normal supply frequency of 50 cycles, the tenth harmonic of 500 cycles can comparatively readily be obtained and this gives good results with transient signals of the type in question. If the amplifier is employed for vehicle detection in conjunction with magnetic detectors of the type disclosed in our co-pending application Ser. No. 272,196, filed February 18, 1952, the D. C. supply required for the magnetising windings of the detector is preferably obtained from the same rectifier. Separate adjustments may be provided for the voltage fed to these magnetising windings and for the voltage fed to the polarizing windings of the magnetic amplifier.

The invention will be better understood from the following description of a preferred method of carrying it into effect which should be taken in conjunction with the accompanying drawing.

Leads 1 and 2 extend from the commercial power supply at 50 cycles and feed the rectifier bridge 3. The output from the D. C. corners of this bridge is smoothed by the circuit comprising the inductors 4 and 5 and capacitors 6 and 7 and then extends to the polarising windings of the magnetic amplifier in series with a variable resistor 8 and to the magnetising windings of the detectors in series with a variable resistor 9. The unsmoothed D. C. having an appreciable content of harmonics of the mains frequency is also fed to a saturable choke 13 by way of a filter circuit comprising inductor 10 and capacitors 11 and 12 and arranged to pass the second harmonic. This choke serves to produce a number of odd harmonics which extend to the network comprising capacitors 14 and 15 and inductors 16 and 17. Capacitor 14 is adjustable so as to control the output and the values of the other components are so chosen that a bandpass filter is formed which suppresses all the odd harmonics generated by the saturable choke 13 except the fifth i. e. the tenth harmonic of the commercial frequency or 500 cycles. This is then passed to the transformer 18, the secondary of which is centre-tapped at 19. The secondary of the transformer 18 feeds the rectifier bridge 20 by way of the operating windings 21, 22, 23 and 24 of the magnetic amplifier, the connection between windings 22 and 23 including the trimmer resistor 25, the slider of which is connected to the appropriate corner of the bridge 20 and serves to alter the degree of unbalance and hence to adjust the sensitivity.

The magnetic amplifier is generally of known construction provided with four cores as indicated in the drawing, each carrying one of the operating windings 21—24 which are interconnected in reverse direction to decouple them from the D. C. windings. The magnetic amplifier is also provided with polarising windings 26 and 27 which are fed from the D. C. supply by way of potentiometer 8. These windings each embrace two cores and they are therefore connected in series opposition to decouple them from the control winding and which is wound round all four cores; this arrangement avoids increasing the time constant of the amplifier. The magnetic amplifier also has a feedback winding 28 which is connected across the D. C. terminals of the bridge 20 in series with large capacitor 29. Also connected across these terminals is the relay R in series with resistor 30 and shunted by small capacitor 31. Relay R, in addition to carrying contacts (not shown) for exerting the necessary control of the signalling circuit, is also provided with contacts R1 in the circuit of capacitor 29. When relay R is in normal position, capacitor 29 is connected in circuit as already described but when the relay operates due to the receipt of a signal, contacts R1 change over and the capacitor 29 is then discharged quickly through the low value resistor 32. This is desirable in order to speed up the restoration of the sensitivity of the magnetic amplifier which would otherwise be reduced while capacitor 29 was discharging through the feedback winding.

The control winding of the magnetic amplifier is shown at 33 and this is supplied over leads 34 and 35 from the detector assembly. As shown this comprises four units 36, 37, 38 and 39 provided with operating windings which are connected in series as regards the adjacent detectors 36 and 37 and 38 and 39 but in series opposition as regards the two groups. The magnetising windings of all four units are shown connected in series and supplied with D. C. from the potentiometer 9. This arrangement, as indicated in the specification previously referred to, introduces a decoupling effect so as to render the detectors largely insensitive to variations of supply voltage and particularly ripple voltages.

The operation is that when a vehicle passes over the detectors, an impulse of rather complicated shape dependent on the distribution of magnetic material in the vehicle is produced and energises the control winding 33. If this impulse exceeds a certain minimum amplitude the positive feedback provided by winding 28 is excessive and causes a short period of temporary instability during which the amplifier becomes self-saturated. It will be appreciated that owing to the presence of capacitor 29 this excessive positive feedback can only be provided while the input signal is changing in a particular direction. During the period of instability the output from the rectifier bridge attains a substantially constant value which is sufficient to operate the relay R reliably and consequently a suitable signal is passed forward to the equipment to be controlled. At the same time contacts R1 change over and discharge the capacitor 29 and this enables the amplifier to regain its normal sensitivity with less delay than would otherwise occur. The period of instability only lasts for a fraction of a second, but the effect of the arrangement is that incoming signals of various amplitudes all produce a similar output and consequently reliable operation of the relay R is obtained for any signals which exceed the definite threshold value. It will be appreciated that this method of working is only satisfactory where the input signals represent in effect a single detached impulse which is not required to be amplified without distortion. This however is the case in the circumstances visualized.

According to a modification which may be used instead of or in addition to the arrangement shown for shunting the capacitor 29 when the relay R operates, a further capacitor may be provided which is charged from a suitable D. C. source, for instance by way of a further resistor similar to resistors 8 and 9. By means of suitable change-over contacts carried by relay R, it is arranged that when this relay operates the fully-charged capacitor discharges through one or other of the D. C. windings 26/27, 28 or 33, conveniently the feedback winding 28 and thus also hastens the restoration of the normal sensitive stand-by state.

It will be appreciated that the arrangement for obtaining a higher frequency for operation of the amplifier could readily be varied and that if a polyphase power supply is available, other measures may be adopted; for instance if equal saturable chokes are provided in all the phases of a star-connected transformer, third harmonics and multiples thereof will be present in the star-to-earth connection.

It will be understood that the feed-back and polarising currents can be applied to the magnetic amplifier by any other of the methods known in the art; for instance two or more of the windings 26, 27, 28 and 33 may be combined in a single winding.

We claim:

1. A magnetic amplifier for effecting the momentary operation of an electromagnetic relay in response to an impulsive signal, comprising in combination, a centre-tapped source of alternating current, a rectifier bridge, two operating windings for said amplifier connected respectively in series with the two halves of said source to opposite corners of said bridge, a relay connected to the other opposite corners of said bridge, a control winding for said amplifier, means for applying an impulsive signal to said control winding, a feedback winding for said amplifier, and a circuit element which passes alternating but not direct current connected in series with said feedback winding to said other opposite corners of said bridge, the various components being so connected and having such values that in response to an impulsive signal exceeding a predetermined threshold value, excessive positive feedback is provided by said feedback winding to cause said amplifier to become temporarily unstable whereby current of value substantially independent of the value of said impulsive signal flows through said relay to cause its reliable operation.

2. A magnetic amplifier as claimed in claim 1 in which said centre-tapped source provides alternating current of audio frequency which is obtained from a source of commercial frequency by way of a full-wave rectifier, a first filter, a saturable choke, a second filter and interconnections whereby rectified and filtered current is supplied to the saturable choke and one of the harmonics produced is filtered out and fed to a transformer, the secondary of which is centre-tapped.

3. A magnetic amplifier for effecting the momentary operation of an electromagnetic relay in response to an impulsive signal, comprising in combination, a centre-tapped source of alternating current, a rectifier bridge, two operating windings for said amplifier connected respectively in series with the two halves of said source to opposite corners of said bridge, a relay connected to the other opposite corners of said bridge, a control winding for said amplifier, means for applying an impulsive signal to said control winding, a feedback winding for said amplifier, and a capacitor connected in series with said feedback winding to said other opposite corners of said bridge, the various components being so connected and having such values that in response to an impulsive signal exceeding a predetermined threshold value, excessive positive feedback is provided by said feedback winding to cause said amplifier to become temporarily unstable whereby current of value substantially independent of the value of said impulsive signal flows through said relay to cause its reliable operation.

4. A magnetic amplifier for effecting the momentary operation of an electromagnetic relay in response to an impulsive signal, comprising in combination, a centre-tapped source of alternating current, a rectifier bridge, two operating windings for said amplifier connected respectively in series with the two halves of said source to opposite corners of said bridge, a relay connected to the other opposite corners of said bridge, a control winding for said amplifier, means for applying an impulsive signal to said control winding, a feedback winding for said amplifier, a capacitor connected in series with said feedback winding to said other opposite corners of said bridge, and contacts controlled by said relay and arranged in operation to disconnect said capacitor from said feedback winding and discharge it through a low resistance, the various components being so connected and having such values that in response to an impulsive signal exceeding a predetermined threshold value, excessive positive feedback is provided by said feedback winding to cause said amplifier to become temporarily unstable whereby current of value substantially independent of the value of said impulsive signal flows through said relay to cause its reliable operation.

5. A magnetic amplifier for effecting the momentary operation of an electromagnetic relay in response to an impulsive signal, comprising in combination, a source of alternating current, a transformer having its primary winding connected to said source and having a centre-tapped secondary, a resistor, two operating windings for said amplifier connected in series to the ends of said secondary with said resistor in series between them, a rectifier bridge, a connection from said centre-tapping to one corner of said bridge, a slider arranged to be movable over said resistor, a connection from said slider to the opposite corner of said bridge, a relay connected to the other opposite corners of said bridge, a control winding for said amplifier, means for applying an impulsive signal to said control winding, a feedback winding for said amplifier, and a capacitor connected in series with said feedback winding to said other opposite corners of said bridge, the various components being so connected and having such values that in response to an impulsive signal exceeding a predetermined threshold value, excessive positive feedback is provided by said feedback winding to cause said amplifier to become temporarily unstable whereby current of value substantially independent of the value of said impulsive signal flows through said relay to cause its reliable operation.

References Cited in the file of this patent

UNITED STATES PATENTS

| | | |
|---|---|---|
| 2,414,936 | Edwards et al. | Jan. 28, 1947 |
| 2,518,865 | Cartotto | Aug. 15, 1950 |